United States Patent [19]

Ikawa et al.

[11] Patent Number: 5,652,491
[45] Date of Patent: Jul. 29, 1997

[54] POSITION CONTROLLER FOR AN ELECTRIC MOTOR

[75] Inventors: Yasushi Ikawa; Masanori Ozaki; Shizuo Kumekawa; Tetsuaki Nagano; Fumio Kumazaki, all of Aichi, Japan

[73] Assignee: Mitsubishi Denki Kabushiki Kaisha, Tokyo, Japan

[21] Appl. No.: 623,375

[22] Filed: Mar. 28, 1996

[30] Foreign Application Priority Data

Mar. 28, 1995 [JP] Japan .................. 7-069419

[51] Int. Cl.$^6$ .................. G05D 3/12
[52] U.S. Cl. .................. 318/632; 318/611; 318/430; 318/432; 388/902
[58] Field of Search .................. 318/560, 561, 318/566, 568.22, 609, 610, 611, 618, 623, 630, 632, 633, 430, 432, 433; 388/902, 906

[56] References Cited

U.S. PATENT DOCUMENTS

| | | | |
|---|---|---|---|
| 4,724,370 | 2/1988 | Moraru et al. | 318/561 |
| 4,887,695 | 12/1989 | Kindler . | |
| 5,006,770 | 4/1991 | Sakamoto et al. | 318/561 |
| 5,134,354 | 7/1992 | Yamamoto et al. | 318/609 |

FOREIGN PATENT DOCUMENTS

| | | |
|---|---|---|
| 1-214908 | 8/1989 | Japan . |
| 1-234136 | 9/1989 | Japan . |
| 3-150610 | 6/1991 | Japan . |
| 4-141708 | 5/1992 | Japan . |

OTHER PUBLICATIONS

Nagano et al. "Two Degrees of Freedom Position Controller Using Reference System Model for Motor Drives", Electric Acadamy, Industrial Application, National Convention Paper No. 178, Japan, 1992.

*Primary Examiner*—Bentsu Ro
*Attorney, Agent, or Firm*—Sughrue, Mion, Zinn, Macpeak & Seas

[57] ABSTRACT

A position controller includes: a compensation torque control circuit which outputs a second torque signal $T_2^*$ and an initial value of an integration torque $T_{iset}$ on the basis of a real speed signal $\omega_M$, a rotation angle instruction signal $\theta_M^*$, a real rotation angle signal $\theta_M$, an integration torque signal $T_i$ of a speed control circuit, and a reference $\theta_{drp}^*$; a speed control circuit which outputs a first torque signal $T_1^*$ and the integration output $T_i$ on the basis of a speed instruction signal $\omega_M^*$ and the real speed signal $\omega_M$; an adder which adds the first torque signal $T_1^*$ to the second torque signal $T_2^*$ and outputs a torque instruction signal; and a torque control circuit which controls the torque of the motor in accordance with the torque instruction signal.

5 Claims, 11 Drawing Sheets

POSITION CONTROLLER FOR AN ELECTRIC MOTOR

BACKGROUND OF THE INVENTION

1. Field of the Invention

This invention relates to a position controller for an electric motor such as a DC motor, an induction motor, or a synchronous motor, which drives a load machine such as a table of a machine tool, or an arm of an industrial electric robot.

2. Description of the Related Art

The configuration of a prior art example will be described with reference to a figure. FIG. 14 is a block diagram showing an example of a prior art position control system for an electric motor. In the figure, reference numeral 1 designates a rotation angle instruction signal generation circuit; 2, a position control circuit; 3, a speed control circuit; 10, a torque control circuit; 11, an electric motor; 12, a torque transmission mechanism; 13, a load machine; and 14, a rotation detector. The motor 11 drives the load machine 13 via the torque transmission mechanism 12. The rotation detector 14 detects the speed and the position of the motor 11 and outputs of a speed signal $\omega_M$ and a real rotation angle signal $\theta_M$. The position control circuit 2 comprises a subtracter 20 which outputs a deviation $(\theta_M{}^*-\theta_M)$ between a rotation angle instruction signal $\theta_M{}^*$ output from the rotation angle instruction signal generation circuit 1 and a real rotation angle signal $\theta_M$, and a coefficient unit 21 which proportionally amplifies the deviation $(\theta_M{}^*-\theta_M)$ and outputs a speed instruction signal $\omega_M{}^*$, and conducts a control so that the signal $\theta_M{}^*$ follows the signal $\theta_M$. The speed control circuit 3 comprises a subtracter 22 which outputs a deviation $(\omega_M{}^*-\omega_M)$ between the speed instruction signal $\omega_M{}^*$ and a real speed signal $\omega_M$, and a proportional integrator 50 which proportion-integrally amplifies the deviation $(\omega_M{}^*-\omega_M)$ and outputs a torque instruction signal $T_M{}^*$, and conducts a control so that the signal $\omega_M$ follows the signal $\omega_M{}^*$. The torque control circuit 10 controls the torque of the motor 11 in accordance with the torque instruction signal $T_M{}^*$.

In the prior art position controller for an electric motor, there has been known that the speed deviation $(\omega_M{}^*-\omega_M)$ is caused to oscillate by Coulomb's friction between the motor and the torque transmission mechanism and the load machine. The torque component of Coulomb's friction is accumulated in the integrator of the speed control circuit 3, and then output as the torque instruction signal. As well known in the art, only when the motor is operated, Coulomb's friction is generated. When the motor is stopped, Coulomb's friction disappears so that the speed deviation is reduced, but the speed control circuit 3 outputs the toque component accumulated in the integrator as the torque instruction signal $T_M{}^*$. The torque control circuit 10 controls the torque of the motor 11 on the basis of the torque instruction signal $T_M{}^*$. This leads to a problem in that positional overshoot occurs.

SUMMARY OF THE INVENTION

This invention has been made in view of the above, and therefore an object of the invention is to provide a position controller which is capable of realizing position control with very small overshoot in response to a rotation angle instruction signal.

In order to solve the above problem, according to a first aspect of the invention, there is provided a position controller for an electric motor comprising: a position control circuit which outputs a speed instruction signal on the basis of a rotation angle instruction signal instructing a rotation angle of the motor and a motor rotation angle signal output from a rotation detector; a speed control circuit including at least one integrator to output a first torque signal on the basis of the speed instruction signal and a motor rotation speed signal output from said rotation detector; an adder which adds the first torque signal to a second torque signal to output a torque instruction signal; control means for controlling a torque of the motor on the basis of the torque instruction signal; a compensation torque control circuit which outputs a deviation between an output of said integrator of said speed control circuit immediately before start of rotation and the output of said integrator of said speed control circuit immediately before start of deceleration, as the second torque signal, and after start of deceleration of the motor, holds the output and outputs a value which does not cause the torque instruction signal to be discontinuous, as an initial value of said integrator of said speed control circuit on the basis of the output of said integrator of said speed control circuit immediately before start of deceleration and the second torque signal immediately after start of deceleration, and when a positional deviation between the rotation angle instruction signal and the motor rotation angle signal in deceleration and stop of the motor is not larger than a reference, outputs the output of said integrator of said speed control circuit immediately before start of rotation as the initial value of said integrator of said speed control circuit and stops the output of the second torque signal.

According to a second aspect of the invention, the position controller further comprises a reference adjust circuit which, in deceleration and stop of the motor, adjusts the reference so that the positional deviation at a timing when the motor rotation speed signal becomes zero is reduced.

According to a third aspect of the invention, the position controller further comprises a reference adjust circuit which, in deceleration and stop of the motor, adjusts the reference so that the positional deviation at a timing when a differential of the motor rotation angle instruction signal becomes zero is reduced.

According to a fourth aspect of the invention, the position controller further comprises a reference adjust circuit which adjusts the reference so that the positional overshoot in deceleration and stop of the motor is reduced.

According to a fifth aspect of the invention, the position controller further comprises a low-pass filter which inhibits a portion of the second torque signal which is not lower than a desired frequency from passing therethrough, wherein when the output of the second torque signal is to be stopped, a value which does not cause the torque instruction signal to be discontinuous is used as an initial value on the basis of the torque instruction signal immediately before the stop of the output of the second torque signal and the output of the integrator of said speed control circuit immediately before start of rotation, and an output of said low-pass filter is used as the second torque signal.

In the position controller for an electric motor according to the first aspect of the invention, the electric motor drives a load machine via a torque transmission mechanism. The position control circuit outputs the speed instruction signal so that the motor and the torque transmission mechanism have desired response characteristics to an externally supplied position instruction signal and disturbance. The speed control circuit outputs the first torque signal so that the motor and the torque transmission mechanism have desired response characteristics to the position instruction signal and disturbance. The output of the integrator of the speed control circuit is considered. The compensation torque control circuit controls the second torque signal and the initial value of the integrator on the basis of the motor rotation speed signal and the positional deviation, so that the torque component accumulated during the rotation of the motor is stabilized without causing positional overshoot in deceleration and stop of the motor. The adder adds the first torque signal to the second torque signal and outputs the torque instruction signal. The torque control means controls the torque of the motor on the basis of the torque instruction signal.

In the position controller for an electric motor according to the second aspect of the invention, the reference adjust circuit adjusts the reference of the positional deviation in the compensation torque control circuit on the basis of the motor rotation speed signal.

In the position controller for an electric motor according to the third aspect of the invention, the reference adjust circuit adjusts the reference of the positional deviation in the compensation torque control circuit on the basis of a differential of the rotation angle instruction signal of the motor.

In the position controller for an electric motor according to the fourth aspect of the invention, the reference adjust circuit adjusts the reference of the positional deviation in the compensation torque control circuit on the basis of the amount of positional overshoot which is caused in deceleration and stop of the motor.

In the position controller for an electric motor according to the fifth aspect of the invention, the low-pass filter allows a portion of the second torque signal which is not higher than the desired frequency to pass therethrough, the initial value is set to be a value which does not causes the torque instruction signal to be discontinuous, and the adder adds the filter output of the low-pass filter to the first torque signal and outputs the addition result as the torque instruction signal.

BRIEF DESCRIPTION OF THE DRAWINGS

The accompanying drawings, which are incorporated in and constitute a part of this specification, illustrate (an) embodiment(s) of the invention and, together with the description, serve to explain the objects, advantages and principles of the invention. In the drawings.

DETAILED DESCRIPTION OF THE PREFERRED EMBODIMENTS

Embodiment 1

Figure 1:
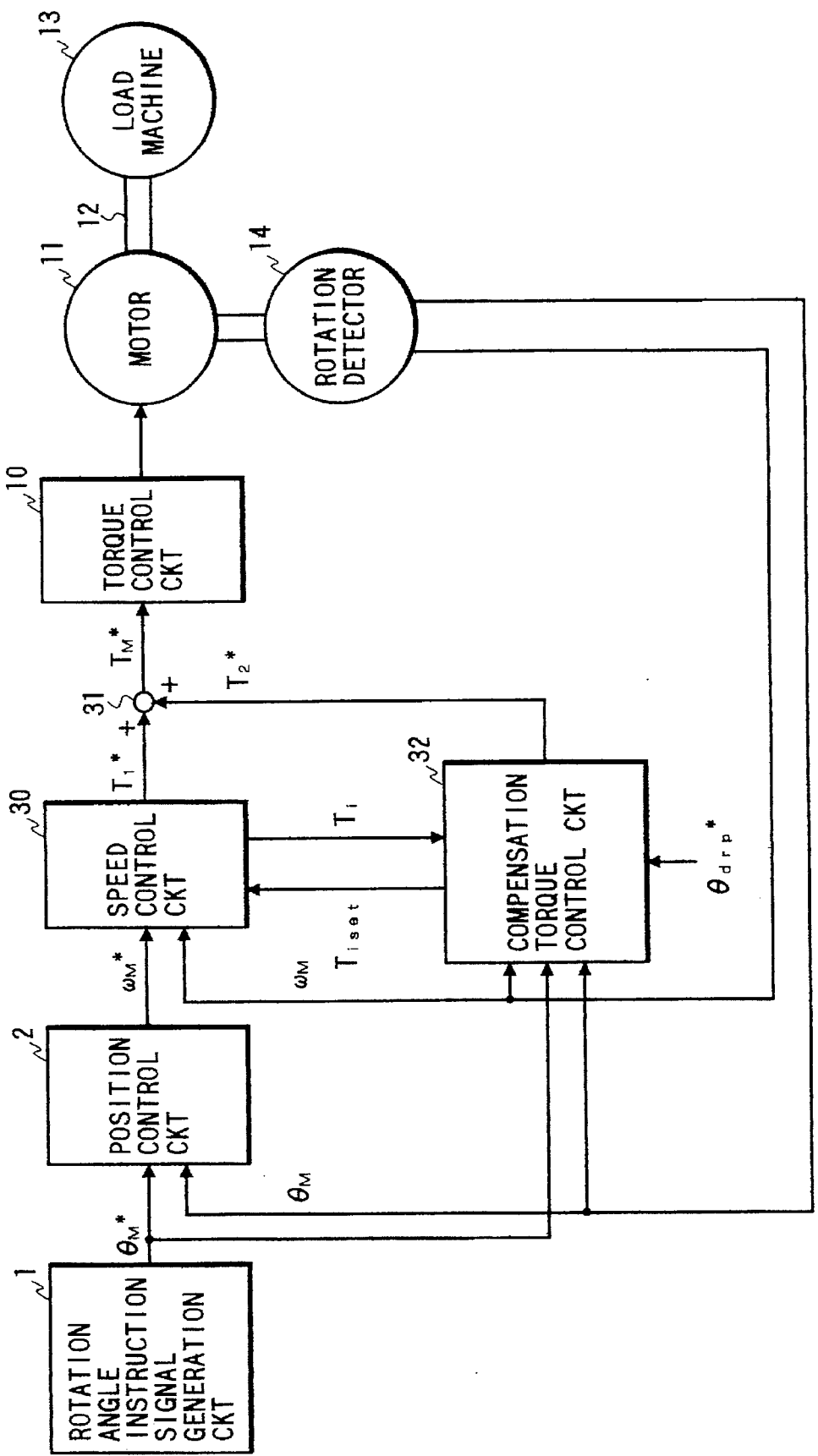
FIG. 1 is a block diagram showing a position controller according to a first embodiment of the invention.
Figure 14:
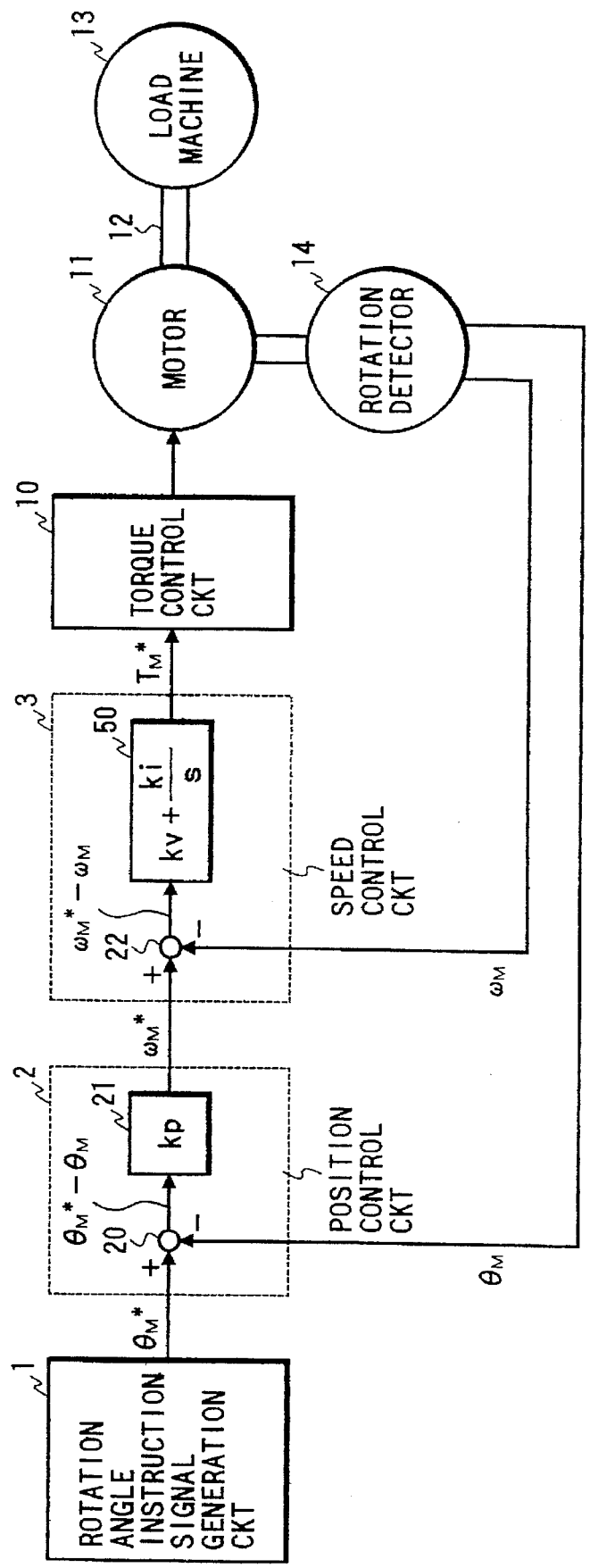
FIG. 14 is a block diagram showing an example of a prior art position control system for an electric motor.

A first embodiment of the invention will be described with reference to FIGS. 1 to 6. FIG. 1 is a block diagram showing the whole position controller according to the first embodiment of the invention. A rotation angle instruction signal generation circuit 1, a position control circuit 2, an electric motor 11, a torque transmission mechanism 12, a load machine 13, and a rotation detector 14 are the same as those of the prior art controller shown in FIG. 14. Reference numeral 30 designates a speed control circuit which outputs a first torque signal $T_1*$ and an integration output $T_i$ on the basis of the speed instruction signal $\omega_M*$, the real speed signal $\omega_M$, and an initial value of the integration term $T_{iset}$ (described later), 32 designates a compensation torque control circuit which outputs a second torque signal $T_2*$ and the initial value of the integration term $T_{iset}$ on the basis of the rotation angle instruction signal $\theta_M*$, the real rotation angle signal $\theta_M$ output from the rotation detector, the real speed signal $\omega_M$, a reference $\theta_{drp}*$ (described later), and the integration output $T_i$ output from the speed control circuit, 31 designates an adder which adds the first torque signal $T_1*$ to the second torque signal $T_2*$ and outputs a torque instruction signal $T_M*$, and 10 designates a torque control circuit which controls the torque of the motor 11 in accordance with the torque instruction signal.

Figure 2:
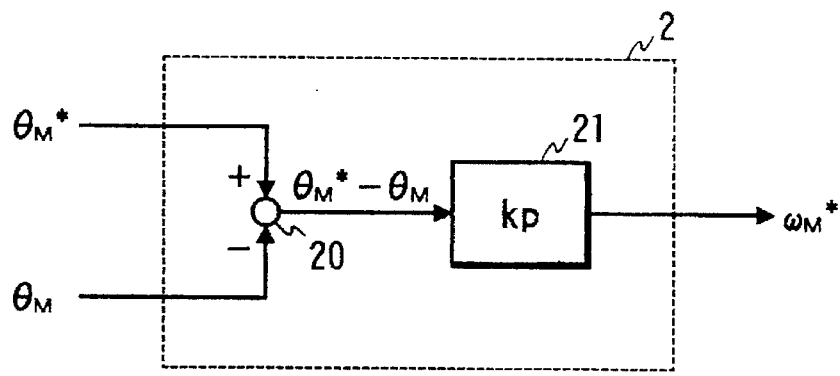
FIG. 2 is a block diagram showing a position control circuit used in first to fifth embodiments of the invention.

FIG. 2 is a block diagram showing in detail the configuration of the position control circuit 2. In the figure, 20 designates a subtracter which outputs a deviation $(\theta_M*-\theta_M)$ between the rotation angle instruction signal $\theta_M*$ output from the rotation angle instruction signal generation circuit 1 and the real rotation angle signal $\theta_M*$, and 21 designates a coefficient unit which has the gain of Kp, proportionally amplifies the deviation $(\theta_M*-\theta_M)$, and outputs the speed instruction signal $\omega_M*$. According to this configuration, the position control circuit 2 can conduct a control so that the real rotation angle signal $\theta_M$ follows the rotation angle instruction signal $\theta_M*$.

Figure 3:
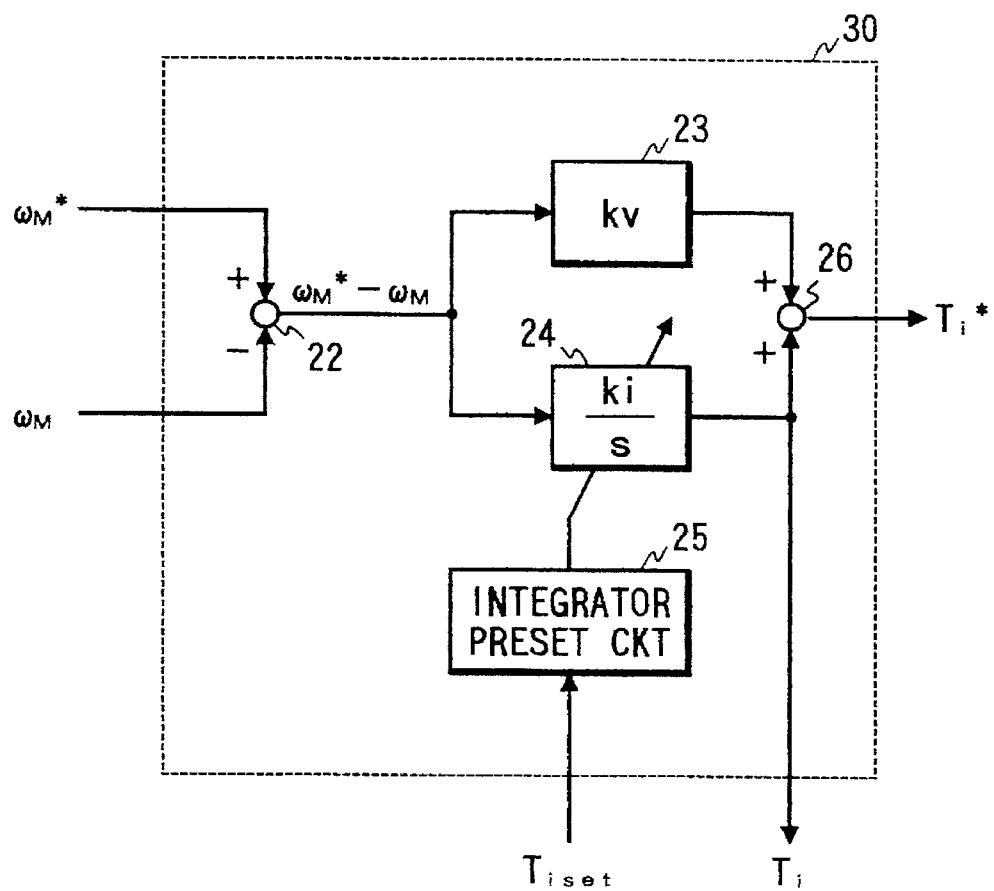
FIG. 3 is a block diagram showing a speed control circuit used in the first to fifth embodiments of the invention.
Figure 4:
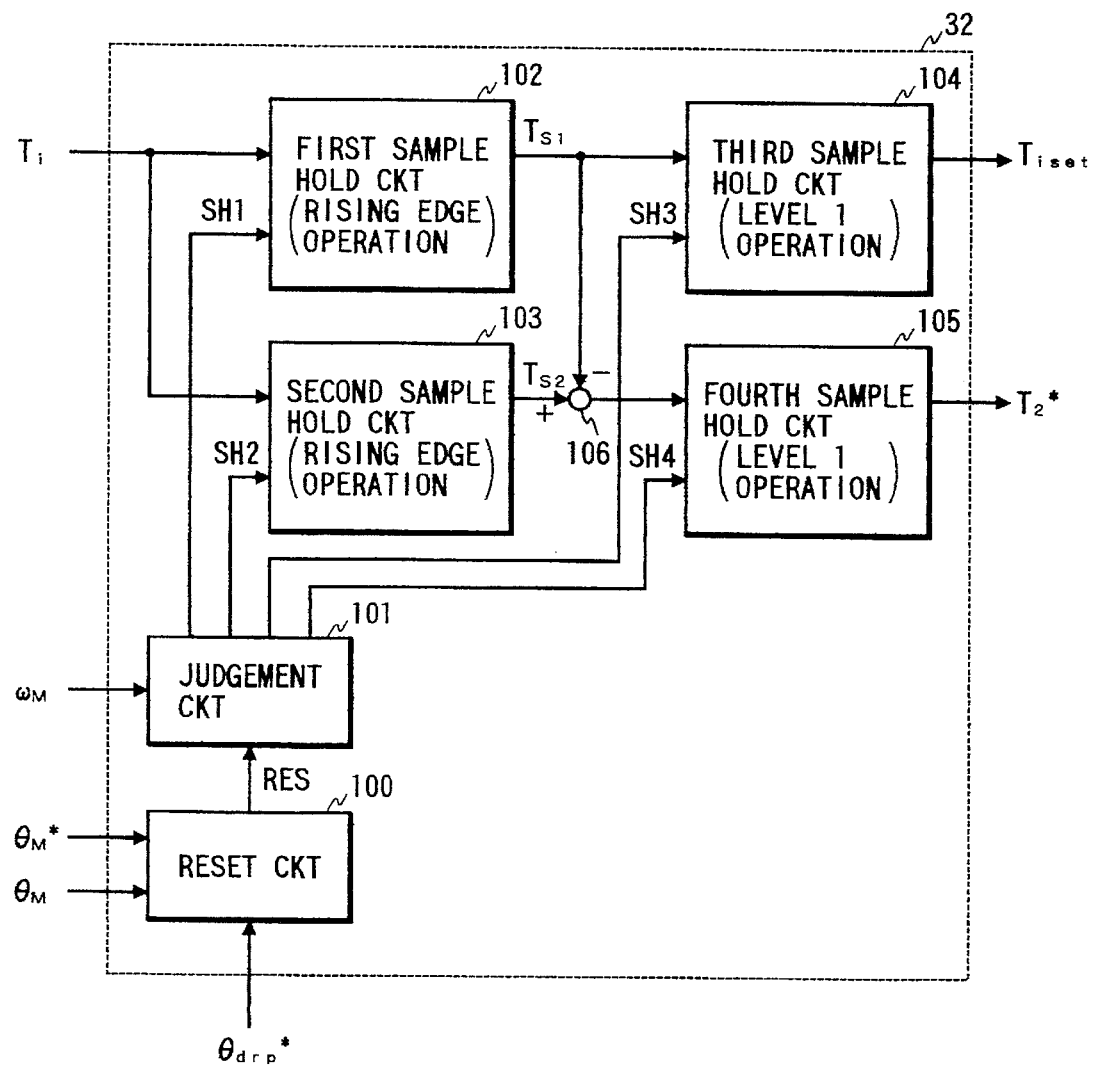
FIG. 4 is a block diagram showing a compensation torque control circuit used in the first to fifth Embodiments of the invention.

FIG. 3 is a block diagram showing in detail the configuration of the speed control circuit 30. In the figure, 22 designates a subtracter which outputs a deviation $(\omega_M*-\omega_M)$ between the speed instruction signal $\omega_M*$ and the real speed signal $\omega_M$, 23 designates a coefficient unit which has the gain of $K_v$ and proportionally amplifies the deviation $(\omega_M*-\omega_M)$, 24 designates an integrator which proportionally amplifies the deviation $(\omega_M*-\omega_M)$ by the integration gain of $K_i$, integrates the amplified deviation, and outputs an integration torque signal $T_i$, 25 designates an integrator preset circuit which, when the circuit receives the initial value of the integration term $T_{iset}$ output from the compensation torque control circuit 32, presets the integration value of the integrator 24, and 26 designates an adder which adds the output of the coefficient unit 23 to that of the integrator 24 and outputs the first torque signal $T_1*$. According to this configuration, the speed control circuit 30 can conduct a control so that the real rotation speed $\omega_M$ follows the speed instruction signal $\omega_M*$.

FIG. 24 is a block diagram showing in detail the configuration of the compensation torque control circuit 32. In the figure, reference numeral 100 designates a reset circuit which outputs a reset signal RES in accordance with the real rotation angle signal $\theta_M$, the rotation angle instruction signal $\theta_M^*$, and the reference $\theta_{drp}^*$, 101 designates a judgment circuit which outputs first to fourth sample hold instruction signals SH1 to SH4 in response to the real rotation speed $\omega_M$ output from the rotation detector 14 and the reset signal RES, 102 designates a first sample hold circuit which sample-holds the integration torque signal $T_i$ at a rising edge of the sample hold instruction signal SH1 and outputs a first sample torque signal $T_{S1}$, 103 designates a second sample hold circuit which sample-holds the integration torque signal $T_i$ at a rising edge of the second sample hold instruction signal SH2 and outputs a second sample torque signal $T_{S2}$, 106 designates a subtracter which outputs a deviation $(T_{S2}-T_{S1})$ between the second and first sample torque signals $T_{S2}$ and $T_{S1}$, 104 designates a third sample hold circuit which, when the third sample hold instruction signal SH3 is 1, sample-holds the first sample torque signal $T_{S1}$ to output the initial value of the integration torque $T_{iset}$, and, when the third sample hold instruction signal SH3 is 0, resets the output, and 105 designates a fourth sample hold circuit which, when the fourth sample hold instruction signal SH4 is 1, sample-holds the output $(T_{S2}-T_{S1})$ of the subtracter 106 to output the second torque signal $T_2^*$, and, when the fourth sample hold instruction signal SH4 is 0, resets the output.

The reset circuit 100 controls the reset signal RES so as to be 1 when the absolute value $|\theta_M^*-\theta_M|$ of the deviation between the real rotation angle signal $\theta_M$ and the rotation angle instruction signal $\theta_M^*$ is not larger than the reference $\theta_{drp}^*$, to be 0 when the absolute value $|\theta_M^*-\theta_M|$ is larger than the reference $\theta_{drp}^*$. The judgment circuit 101 controls the sample hold instruction signals in the following manner. When a product $(\omega_M\times\omega_M^*)$ of the real rotation speed $\omega_M$ and the first differential of the real rotation speed $\omega_M'$ is positive, the first sample hold instruction signal SH1 is set to be 1. When the product $(\omega_M\times\omega_M^*)$ is negative, the first sample hold instruction signal SH1 is set to be 0. When the product $(\omega_M\times\omega_M^*)$ is 0, the first sample hold instruction signal SH1 holds its previous state. When the first sample hold instruction signal SH1 is 0, the second sample hold instruction signal SH2 is set to be 1. When the first sample hold instruction signal SH1 is 1, the second sample hold instruction signal SH2 is set to be 0. When the second sample hold instruction signal SH2 is 1 and the reset signal is 0, the fourth sample hold instruction signal SH4 is set to be 1. When the second sample hold instruction signal SH2 is 0 or the reset signal is 1, the second sample hold instruction signal SH2 is set to be 0. When the value of the second sample hold instruction signal SH2 is not changed, the second sample hold instruction signal SH2 is set to be 0. When the value of the second sample hold instruction signal SH2 is changed from 0 to 1 or from 1 to 0, the fourth sample hold instruction signal SH4 is set to be 1. Table 1 below shows relationships between the outputs of the first to fourth sample hold instruction signals SH1 to SH4 and physical meanings. According to this configuration, the compensation torque control circuit 32 outputs a second torque signal $T_2^*$ and the initial value of the integration term $T_{iset}$ on the basis of the integration torque signal of the speed control circuit immediately before the start of operation conducted in acceleration and deceleration of the motor and also that of the speed control circuit immediately before the start of deceleration, thereby enabling the quantity of state in the speed control circuit to be corrected.

TABLE 1

| | Outputs | | |
| --- | --- | --- | --- |
| | 0 | 1 | Hold previous state |
| SH1 | When motor is decelerated or stopped | When motor is accelerated | When motor is rotated at constant speed |
| SH2 | When motor is accelerated | When motor is decelerated or stopped | When motor is rotated at constant speed |
| SH3 | Case other than listed right | At timing when motor starts to be decelerated or that when positional deviation is not larger than a reference value | — |
| SH4 | Case other than listed right | When motor is decelerated and positional deviation is larger than a reference value | — |

Figure 5:
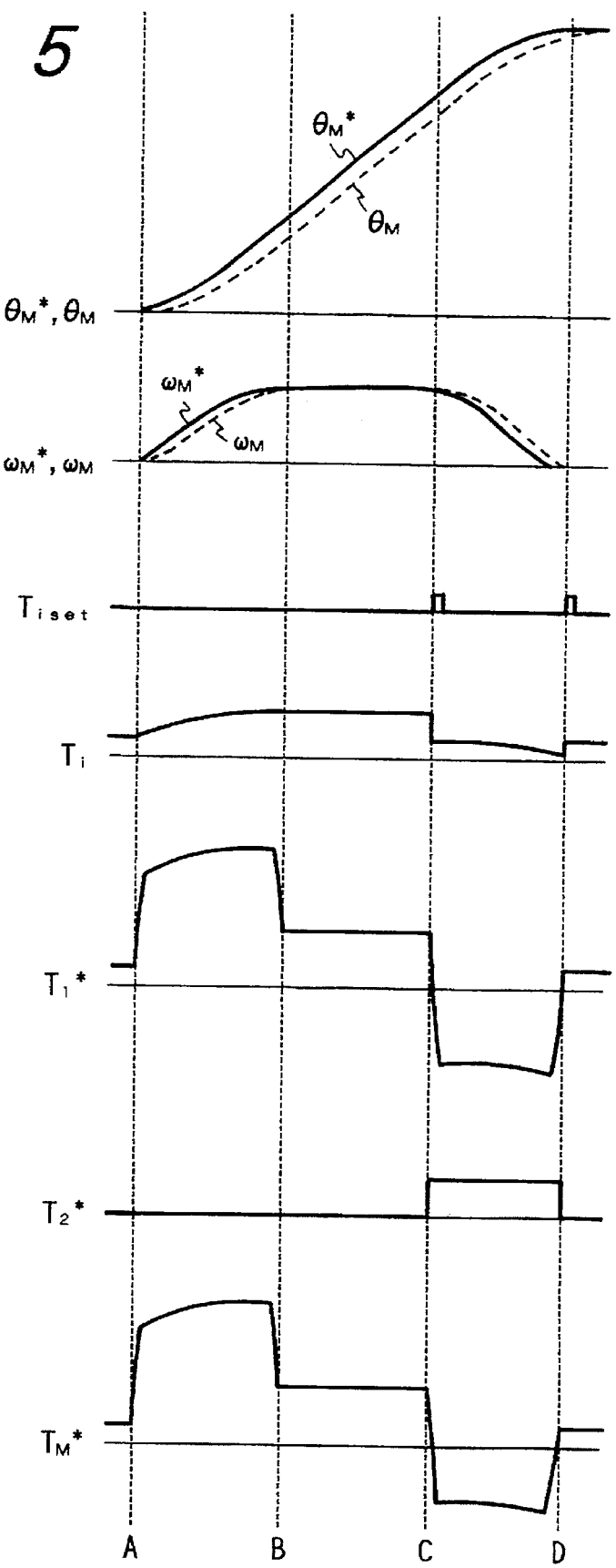
FIG. 5 is a timing chart illustrating the operation of the compensation torque control circuit in the invention.

FIG. 5 is a chart showing changes of, in the case where there exists Coulomb's friction between the motor and the torque transmission mechanism and the load machine, the second torque signal $T_2^*$ and the initial value of the integration torque $T_{iset}$ which are output from the compensation torque control circuit 32 when the rotation angle instruction signal $\theta_M^*$ is changed, the first torque signal $T_1^*$ which is output from the speed control circuit 30, and the torque instruction signal $T_M^*$. It is known that the deviation $(\omega_M^*-\omega_M)$ is caused to oscillate during rotation of the motor by Coulomb's friction between the motor and the torque transmission mechanism and the load machine. The torque component of Coulomb's friction is accumulated in the integrator of the speed control circuit 30 during the period from the timing A when the motor is started and the timing C when the motor begins to be decelerated, and then output as the first torque signal. At the timing C, the compensation torque control circuit 32 corrects the quantity of state of the speed control circuit 30 or presets the integrator of the speed control circuit 30, and at the same time changes the output $t_2^*$ of the compensation torque control circuit 32 or outputs the second torque signal $T_2^*$. As well known in the art, only when the motor is operated, Coulomb's friction is generated, and, when the motor is stopped, Coulomb's friction disappears. The compensation torque control circuit 32 uses the reference $\theta_{drp}^*$ of the positional deviation as an index of the stop stabilization of the motor, and, at the timing when the absolute value $|\theta_M^*-\theta_M|$ of the positional deviation is reduced to the reference $\theta_{drp}^*$ or less, again presets the integrator of the speed control circuit 30 and at the same time stops the output of the second torque signal $T_2^*$, with the result that the torque component of Coulomb's friction is not accumulated in the integrator of the speed control circuit. As a result of the operation, the compensation torque control circuit 32 outputs the second torque signal $T_2^*$ for compensating the component of Coulomb's friction so that overshoot of the real rotation angle signal $\theta_M$ is reduced.

Figure 6:
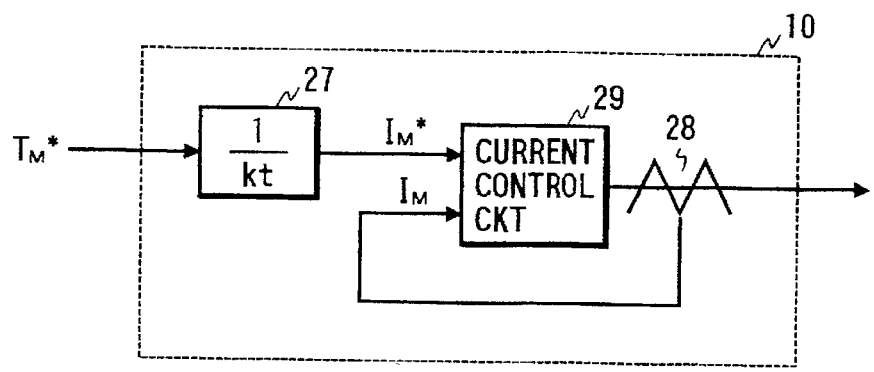
FIG. 6 is a block diagram showing a torque control circuit used in the first to fifth embodiments of the invention.

FIG. 6 is a block diagram showing in detail the configuration of the torque control circuit 10. In the figure, reference numeral 27 designates a coefficient unit which multiplies the torque instruction signal $T_M^*$ by the reciprocal of the torque constant $K_t$ to convert it into a current instruction $I_M^*$, 28 designates a current detector which detects a current $I_M$ of the motor 11, and 29 designates a current control circuit which applies a voltage V to the motor 11 so that the current of the motor 11 follows the current instruction signal $I_M{}^*$. According to the configuration of the figure, the torque control circuit 10 can conduct a control so that the output torque of the motor 11 follows the torque instruction signal $T_M{}^*$. The configuration of the current control circuit 29 is described in detail in, for example, "Theory and Design Practice of AC Servosystem," SOGO DENSHI SHUPPANSHA, 1990, p. 80–85 and 153–155.

Embodiment 2

Figure 7:
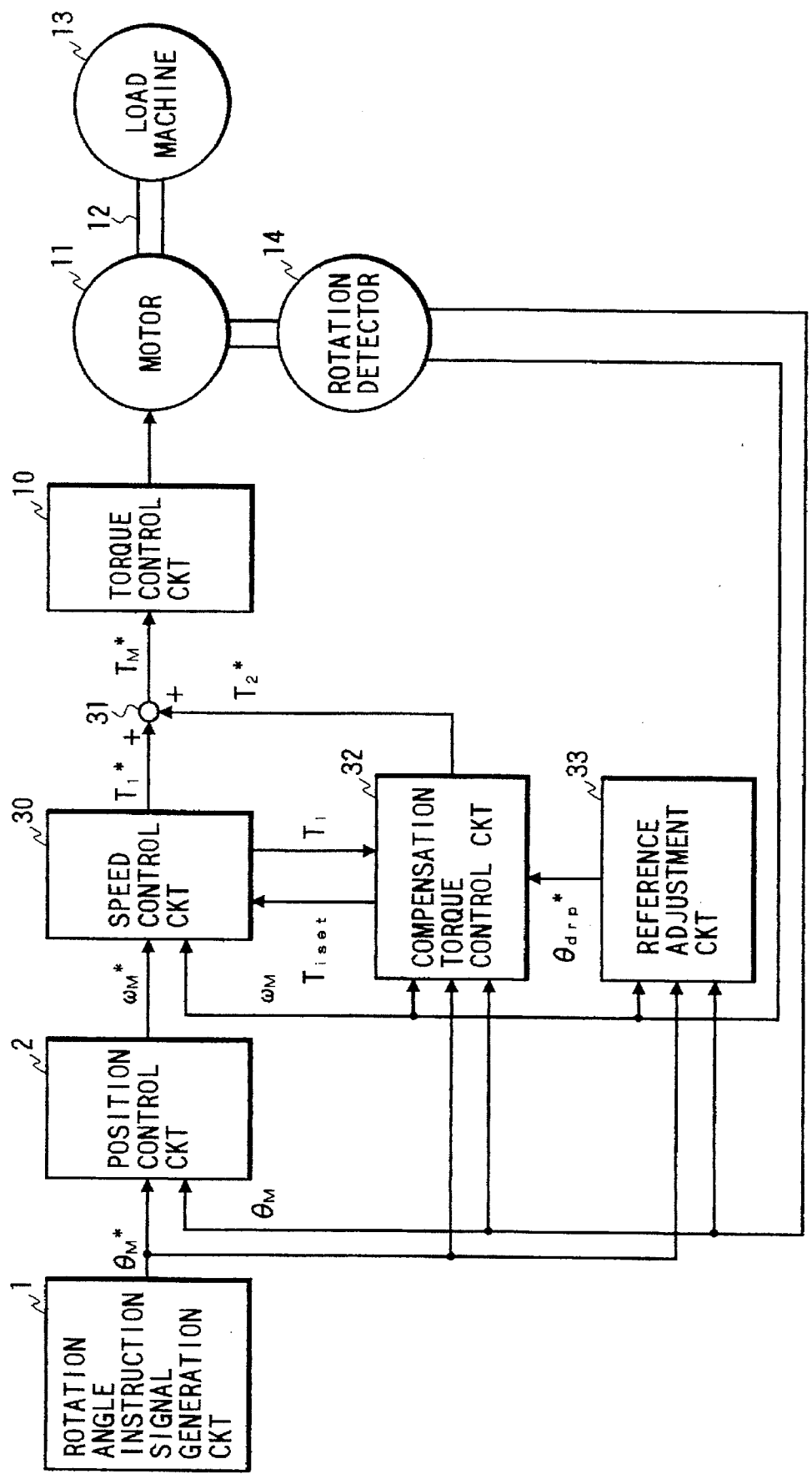
FIG. 7 is a block diagram showing a position controller according to the second embodiment of the invention.

A second embodiment of the invention will be described with reference to FIGS. 7 and 8. FIG. 7 is a block diagram showing the whole position controller according to the second Embodiment of the invention. In the embodiment, the components except a reference adjust circuit 33 operate in the same manner as those of Embodiment 1 described above, and hence their description is omitted.

Figure 8:
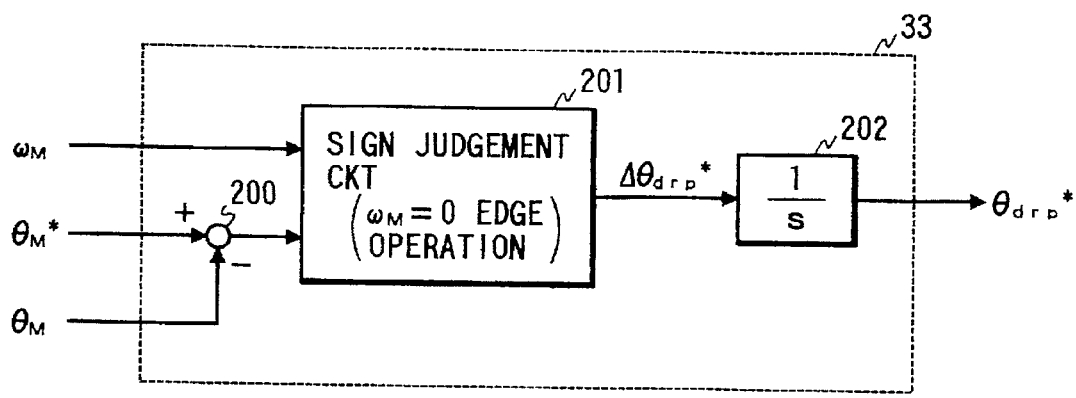
FIG. 8 is a block diagram showing a reference adjust circuit used in the second embodiment of the invention.

FIG. 8 is a block diagram showing in detail the configuration of the reference adjust circuit 33. In the figure, reference numeral 200 designates a subtracter which outputs a deviation $(\theta_M{}^*-\theta_M)$ between the rotation angle instruction signal $\theta_M{}^*$ and the real rotation angle signal $\theta_M$, 201 designates a sign judgment circuit which outputs a reference change amount $\Delta\theta_{drp}{}^*$ in accordance with the deviation $(\theta_M{}^*-\theta_M)$ and the real rotation speed signal $\omega_M$, and 202 designates an integrator which integrates the reference change amount $\Delta\theta_{drp}{}^*$ and outputs the reference $\theta_{drp}{}^*$. The sign judgment circuit 201 adjusts the reference change amount $\Delta\theta_{drp}{}^*$ in the following manner. In the case where the real rotation speed signal $\omega_M$ changes from positive to 0, when the deviation $(\omega_M{}^*-\omega_M)$ is positive, the reference change amount $\Delta\omega_{drp}{}^*$ is set to be 1, and, when the deviation $(\theta_M{}^*-\theta_M)$ is negative, the reference change amount $\Delta\theta_{drp}{}^*$ is set to be −1. In the case where the real rotation speed signal $\omega_M$ changes from negative to 0, when the deviation $(\theta_M{}^*-\theta_M)$ is negative, the reference change amount $\Delta\theta_{drp}{}^*$ is set to be 1, and, when the deviation $(\theta_M{}^*-\theta_M)$ is positive, the reference change amount $\Delta\theta_{drp}{}^*$ is set to be −1. In the case where the real rotation speed signal $\omega_M$ becomes 0, when the deviation $(\theta_M{}^*-\theta_M)$ is 0, the reference change amount $\Delta\theta_{drp}{}^*$ is set to be 0. According to this configuration, the reference adjust circuit can correct the reference $\theta_{drp}{}^*$ on the basis of the real rotation speed of the motor, the rotation angle instruction signal, and the real rotation angle signal, so that the timing of resetting the second torque signal is changed.

Embodiment 3

Figure 9:
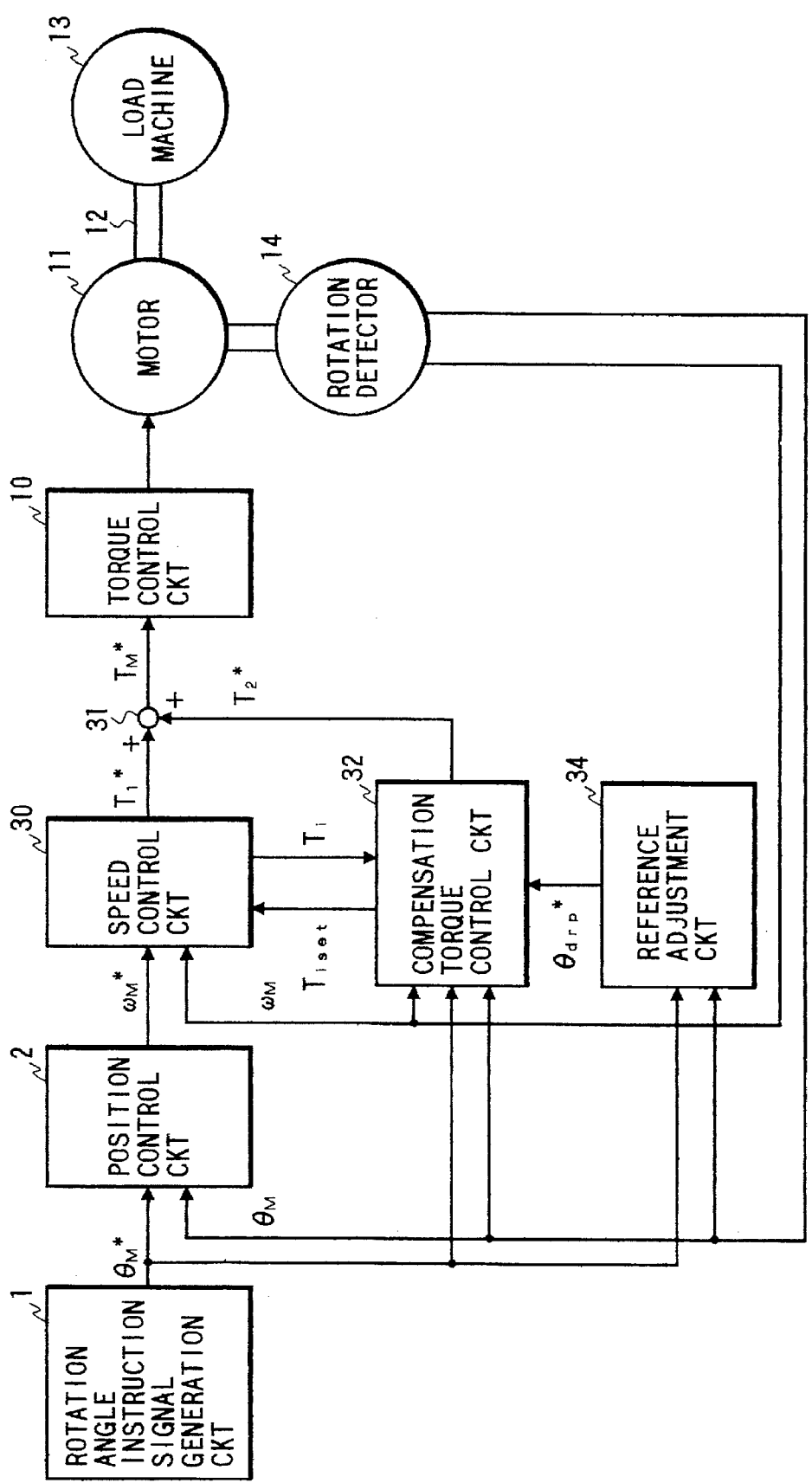
FIG. 9 is a block diagram showing a position controller according to the third embodiment of the invention.

A third embodiment of the invention will be described with reference to FIGS. 9 and 10. FIG. 9 is a block diagram showing the whole position controller according to the third embodiment of the invention. In the embodiment, the components except a reference adjust circuit 34 operate in the same manner as those of Embodiment 1 described above, and hence their description is omitted.

Figure 10:
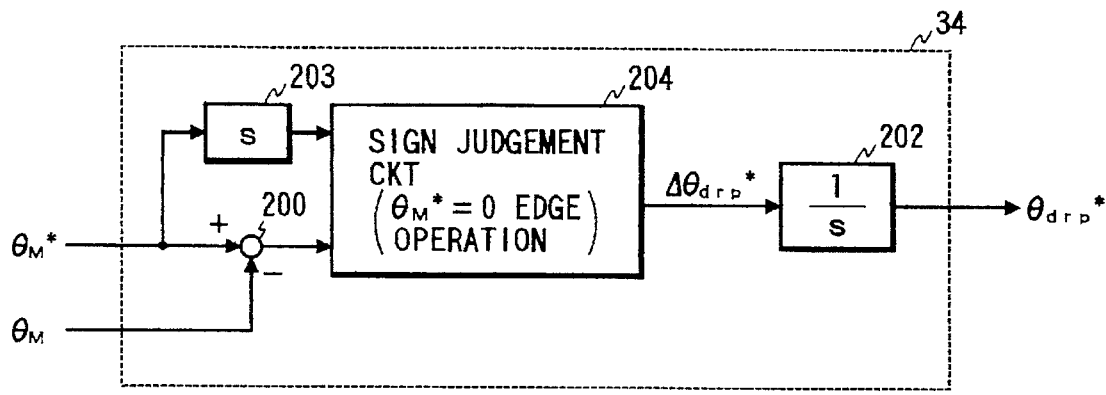
FIG. 10 is a block diagram showing a reference adjust circuit used in the third embodiment of the invention.

FIG. 10 is a block diagram showing in detail the configuration of the reference adjust circuit 34. In the figure, reference numeral 200 designates a subtracter which outputs a deviation $(\theta_M{}^*-\theta_M)$ between the rotation angle instruction signal $\theta_M{}^*$ and the real rotation angle signal $\theta_M$, 203 designates a differentiator which outputs a differential $\theta_M{}^{*'}$ of the rotation angle instruction signal $\theta_M{}^*$, 204 designates a sign judgment circuit which outputs a reference change amount $\Delta\theta_{drp}{}^*$ in accordance with the deviation $(\theta_M{}^*-\theta_M)$ and the differential $\theta_M{}^{*'}$, and 202 designates an integrator which integrates the reference change amount $\Delta\theta_{drp}{}^*$ and outputs the reference $\theta_{drp}{}^*$. The sign judgment circuit 204 adjusts the reference change amount $\Delta\theta_{drp}{}^*$ in the following manner. In the case where the differential $\theta_M{}^{*'}$ changes from positive to 0, when the deviation $(\theta_M{}^*-\theta_M)$ is positive, the reference change amount $\Delta\theta_{drp}{}^*$ is set to be 1, and, when the deviation $(\theta_M{}^*-\theta_M)$ is negative, the reference change amount $\Delta\theta_{drp}{}^*$ is set to be −1. In the case where the differential $\theta_M{}^{*'}$ changes from negative to 0, when the deviation $(\theta_M{}^*-\theta_M)$ is negative, the reference change amount $\Delta\theta_{drp}{}^*$ is set to be 1, and, when the deviation $(\theta_M{}^*-\theta_M)$ is positive, the reference change amount $\Delta\theta_{drp}{}^*$ is set to be −1. In the case where the differential $\theta_M{}^{*'}$ becomes 0, when the deviation $(\theta_M{}^*-\theta_M)$ is 0, the reference change amount $\Delta\theta_{drp}{}^*$ is set to be 0. According to this configuration, the reference adjust circuit can correct the reference $\theta_{drp}{}^*$ on the basis of the rotation angle instruction signal and the real rotation angle signal, so that the timing of resetting the second torque signal is changed.

Embodiment 4

Figure 11:
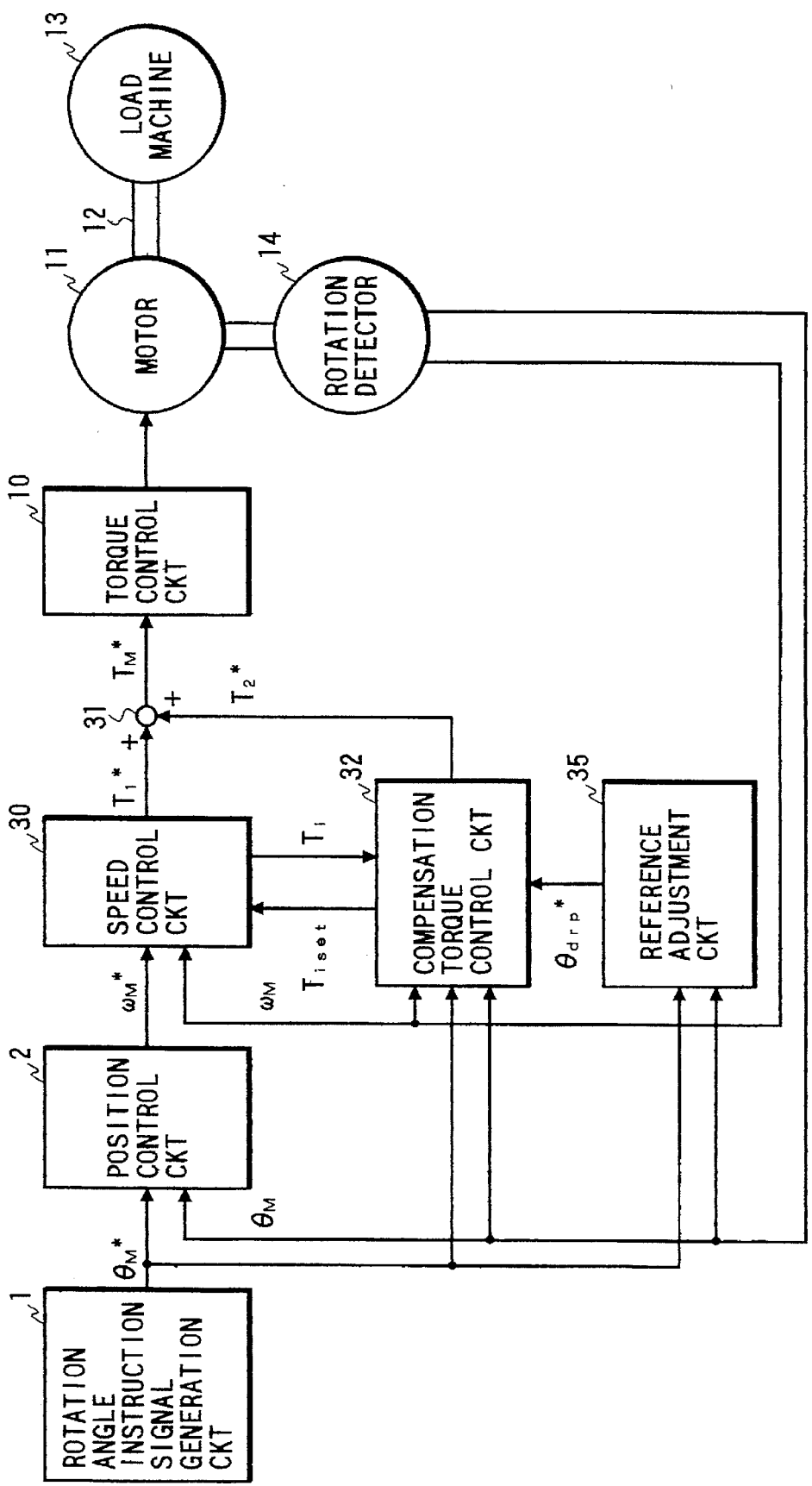
FIG. 11 is a block diagram showing a position controller according to the fourth embodiment of the invention.

A fourth embodiment of the invention will be described with reference to FIGS. 11 and 12. FIG. 11 is a block diagram showing the whole position controller according to the fourth embodiment of the invention. In the embodiment, the components except a reference adjust circuit 35 operate in the same manner as those of Embodiment 1 described above, and hence their description is omitted.

Figure 12:
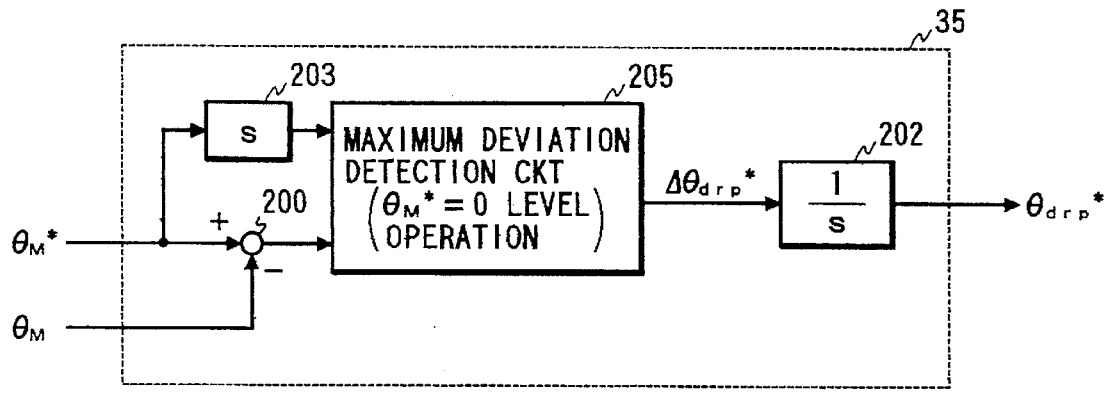
FIG. 12 is a block diagram showing a reference adjust circuit used in the fourth embodiment of the invention.

FIG. 12 is a block diagram showing in detail the configuration of the reference adjust circuit 35. In the figure, reference numeral 200 designates a subtracter which outputs a deviation $(\theta_M{}^*-\theta_M)$ between the rotation angle instruction signal $\theta_M{}^*$ and the real rotation angle signal $\theta_M$, 203 designates a differentiator which outputs the differential $\theta_M{}^{*'}$ of the rotation angle instruction signal $\theta_M{}^*$, 205 designates a maximum deviation detection circuit which outputs a reference change amount $\Delta\theta_{drp}{}^*$ in accordance with the deviation $(\Delta\theta_M{}^*-\theta_M)$ and the differential $\theta_M{}^{*'}$, and 202 designates an integrator which integrates the reference change amount $\Delta\theta_{drp}{}^*$ and outputs the reference $\theta_{drp*}$. The maximum deviation detection circuit 205 adjusts the reference change amount $\Delta\theta_{drp}{}^*$ in the following manner. At the timing when the differential of the deviation $(\theta_M{}^*-\theta_M)$ becomes 0 after the differential $\theta_M{}^{*'}$ changes from positive to 0, when the deviation $(\theta_M{}^*-\theta_M)$ is positive, the reference change amount $\Delta\theta_{drp}{}^*$ is set to be 1, and, when the deviation $(\theta_M{}^*-\theta_M)$ is negative, the reference change amount $\Delta\theta_{drp}{}^*$ is set to be −1. At the timing when the differential of the deviation $(\theta_M{}^*-\theta_M)$ becomes 0 after the differential $\theta_M{}^{*'}$ changes from negative to 0, when the deviation $(\theta_M{}^*-\theta_M)$ is negative, the reference change amount $\Delta\theta_{drp}{}^*$ is set to be 1, and, when the deviation $(\theta_M{}^*-\theta_M)$ is positive, the reference change amount $\Delta\theta_{drp}{}^*$ is set to be −1. At the timing when the differential of the deviation $(\theta_M{}^*-\theta_M)$ becomes 0 after the differential $\theta_M{}^{*'}$ becomes 0, when the deviation $(\theta_M{}^*-\theta_M)$ is 0, the reference change amount $\Delta\theta_{drp}{}^*$ is set to be 0. According to this configuration, the reference adjust circuit can correct the reference $\theta_{drp}{}^*$ on the basis of the rotation angle instruction signal and the real rotation angle signal, so that the timing of resetting the second torque signal is changed.

Embodiment 5

Figure 13:
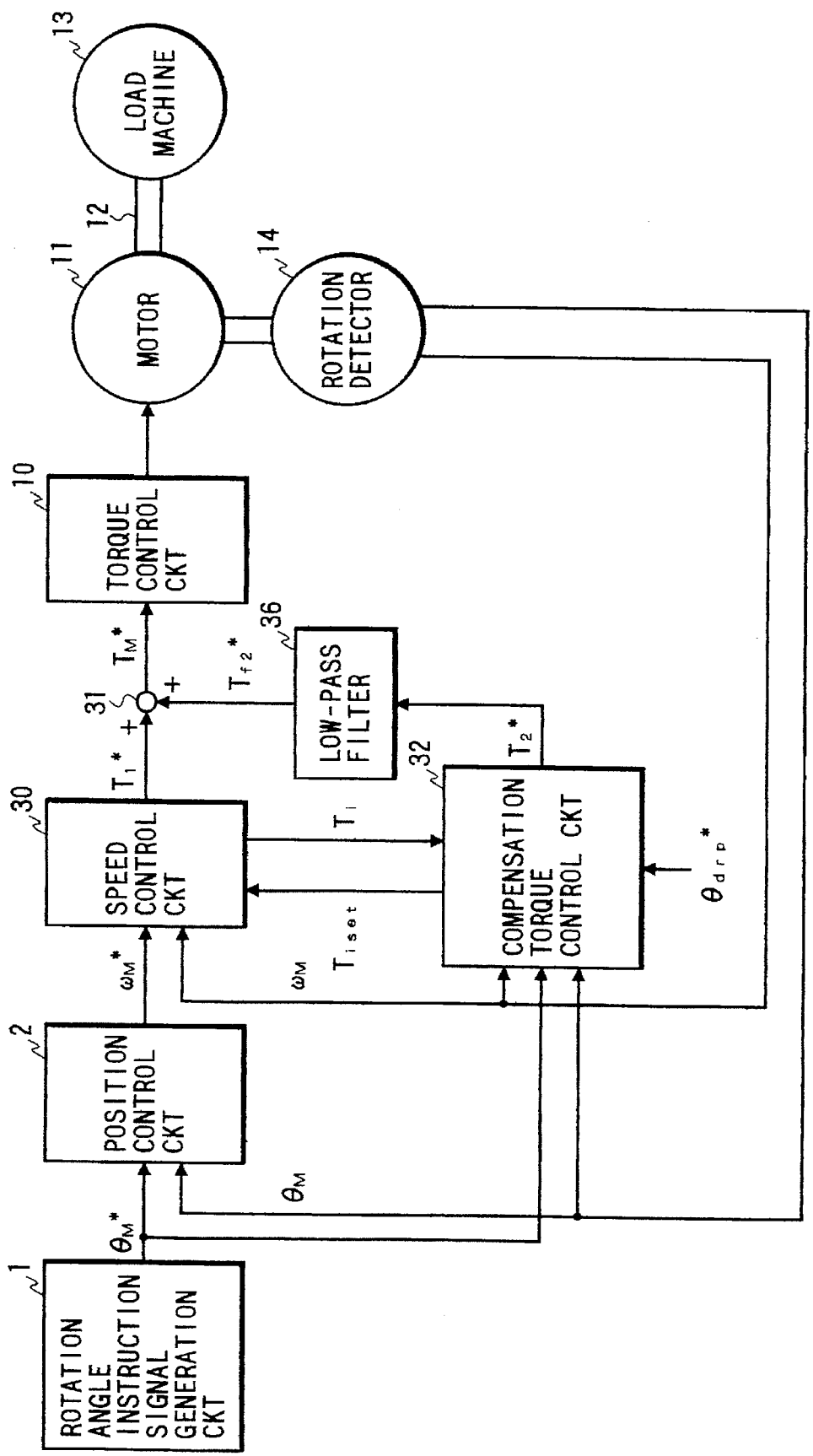
FIG. 13 is a block diagram showing a position controller according to the fifth embodiment of the invention.

A fifth embodiment of the invention will be described with reference to FIG. 13. FIG. 13 is a block diagram showing the whole position controller according to the fifth embodiment of the invention. In the embodiment, the components except a low-pass filter circuit 36 operate in the same manner as those of Embodiment 1 described above, and hence their description is omitted.

The low-pass filter circuit 36 operates when the second torque signal $T_2{}^*$ is reset to be 0, and allows a portion of the second torque signal $T_2^*$ which is not higher than the desired frequency to pass therethrough and outputs a filter output signal $T_{f2}^*$. When the second torque signal is stepwise reset to be 0, the output torque of the motor is stepwise changed so that a strong shock is given to the torque transmission mechanism and the load machine. In contrast, the provision of the low-pass filter circuit enables the stepwise second torque signal to be smoothed, thereby reducing the shock given to the torque transmission mechanism and the load machine.

As described above, according to the first aspect of the invention, the compensation torque control circuit is added so that the friction torque is feedforward-compensated. Therefore, the invention attains the effect that the position control with very small overshoot can be realized in response to the rotation angle instruction signal.

As described above, according to the second aspect of the invention, the compensation torque control circuit and the reference adjust circuit are added so that the friction torque is feedforward-compensated and the reference adjust circuit conducts at least one positioning operation, thereby adjusting the parameters of the compensation torque control circuit. Therefore, the invention attains the effect that, even when Coulomb's friction of the mechanical system is changed, the position control with very small overshoot can be realized in a second or following positioning operation in response to the rotation angle instruction signal.

As described above, according to the third aspect of the invention, the compensation torque control circuit and the reference adjust circuit are added, and speed information required by the reference adjust circuit is obtained from a differential of the rotation angle instruction signal. Therefore, the invention attains the effect that the reference can be adjusted on the basis of speed information which has a reduced noise level and is free from overshoot. Furthermore, the reference adjust circuit conducts at least one positioning operation, thereby adjusting the parameters of the compensation torque control circuit so that the friction torque is feedforward-compensated. Therefore, the invention attains the effect that the position control with very small overshoot can be realized in response to the second or following rotation angle instruction signal.

As described above, according to the fourth aspect of the invention, the compensation torque control circuit and the reference adjust circuit are added, and the maximum value of the positional deviation after the completion of the output of the rotation angle instruction is used as information of the positional deviation required by the reference adjust circuit. Therefore, the invention attains the effect that the adjustment of the reference can be conducted by directly using the amount of overshoot. Furthermore, the reference adjust circuit conducts at least one positioning operation, thereby adjusting the parameters of the compensation torque control circuit so that the friction torque is feedforward-compensated. Therefore, the invention attains the effect that the position control with very small overshoot can be realized in response to the second or following rotation angle instruction signal.

As described above, according to the fifth aspect of the invention, the compensation torque control circuit and the low-pass filter circuit are added so that the torque instruction signal of the compensation torque control circuit is not discontinuous. Therefore, the invention attains the effect that a shock given to the torque transmission mechanism and the load machine can be reduced. Furthermore, the friction torque is feedforward-compensated. Therefore, the invention attains the effect that the position control with very small overshoot can be realized in response to the rotation angle instruction signal.

While some specific embodiments have been described, it should be understood that the present invention is not limited to those embodiments, but may variously be modified, altered and changed within the scope of the present invention.

What is claimed is:

1. A position controller for an electric motor, comprising:
    a position control circuit which outputs a speed instruction signal on the basis of a rotation angle instruction signal instructing a rotation angle of the motor and a motor rotation angle signal output from a rotation detector;
    a speed control circuit which comprises at least one integrator in order to output a first torque signal on the basis of the speed instruction signal and a motor rotation speed signal output from said rotation detector;
    an adder which adds the first torque signal to a second torque signal and outputs a torque instruction signal; and
    control means for controlling a torque of the motor on the basis of the torque instruction signal;
    said controller further comprising a compensation torque control circuit which outputs a deviation between an output of said integrator of said speed control circuit immediately be'fore start of rotation and the output of said integrator of said speed control circuit immediately before start of deceleration, as the second torque signal, and after start of deceleration of the motor, holds the output and outputs a value which does not cause the torque instruction signal to be discontinuous, as an initial value of said integrator of said speed control circuit on the basis of the output of said integrator of said speed control circuit immediately before start of deceleration and the second torque signal immediately after start of deceleration, and when a positional deviation between the rotation angle instruction signal and the motor rotation angle signal in deceleration and stop of the motor is not larger than a reference, outputs the output of said integrator of said speed control circuit immediately before start of rotation as the initial value of said integrator of said speed control circuit and stops the output of the second torque signal.

2. A position controller for an electric motor according to claim 1, wherein said controller further comprises a reference adjust circuit which, in deceleration and stop of the motor, adjusts the reference so that the positional deviation at a timing when the motor rotation speed signal becomes zero is reduced.

3. A position controller for an electric motor according to claim 1, wherein said controller further comprises a reference adjust circuit which, in deceleration and stop of the motor, adjusts the reference so that the positional deviation at a timing when a differential of the motor rotation angle instruction signal becomes zero is reduced.

4. A position controller for an electric motor according to claim 1, wherein said controller further comprises a reference adjust circuit which adjusts the reference so that the positional overshoot in deceleration and stop of the motor is reduced.

5. A position controller for an electric motor according to claim 1, further comprising a low-pass filter which inhibits a portion of the second torque signal, which is not lower than a desired frequency, from passing therethrough; wherein, when the output of the second torque signal is to be stopped, a value which does not cause the torque instruction signal to be discontinuous is used as an initial value on the basis of the torque instruction signal immediately before the stop of the output of the second torque signal and the output of the integrator of said speed control circuit immediately before start of rotation, and an output of said low-pass filter is used as the second torque signal.

* * * * *